US012680832B2

(12) United States Patent
Nakagawa et al.

(10) Patent No.: US 12,680,832 B2
(45) Date of Patent: Jul. 14, 2026

(54) MAP DATA PROVIDING DEVICE, STORAGE MEDIUM, AND MAP DATA PROVIDING METHOD

(71) Applicant: CANON KABUSHIKI KAISHA, Tokyo (JP)

(72) Inventors: Ryo Nakagawa, Kanagawa (JP); Kazuhiko Kobayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 103 days.

(21) Appl. No.: 18/400,136

(22) Filed: Dec. 29, 2023

(65) Prior Publication Data

US 2024/0230371 A1    Jul. 11, 2024

(30) Foreign Application Priority Data

Jan. 11, 2023    (JP) ................................. 2023-002067

(51) Int. Cl.
*G01C 21/00* (2006.01)
(52) U.S. Cl.
CPC ................................. *G01C 21/3889* (2020.08)
(58) Field of Classification Search
CPC ... G01C 21/3889; G01C 21/383; G01C 21/00

USPC .......................................................... 701/451
See application file for complete search history.

(56) References Cited

U.S. PATENT DOCUMENTS

| | | | | |
|---|---|---|---|---|
| 7,965,904 B2 | 6/2011 | Kobayashi | | |
| 8,687,057 B2 | 4/2014 | Kobayashi | | |
| 9,156,162 B2 | 10/2015 | Suzuki | | |
| 11,185,977 B2 * | 11/2021 | Kobayashi | ........... | B25J 15/0683 |
| 11,358,290 B2 | 6/2022 | Yamada | | |
| 2021/0325898 A1 * | 10/2021 | Golov | .................. | G05D 1/0274 |

FOREIGN PATENT DOCUMENTS

JP          2021-77053 A       5/2021

* cited by examiner

*Primary Examiner* — Shardul D Patel
(74) *Attorney, Agent, or Firm* — VENABLE LLP

(57)          ABSTRACT

In order to provide a map suitable for a movable apparatus that operates autonomously, a map data providing device includes an activity range data acquisition unit configured to acquire activity range data indicating an activity range in which a movable apparatus operates autonomously, a determination unit configured to determine a coordinate system and origin of map data to be provided to the movable apparatus based on the activity range data, and a map data providing unit configured to provide the map data based on the coordinate system and origin determined by the determination unit to the movable apparatus.

8 Claims, 9 Drawing Sheets

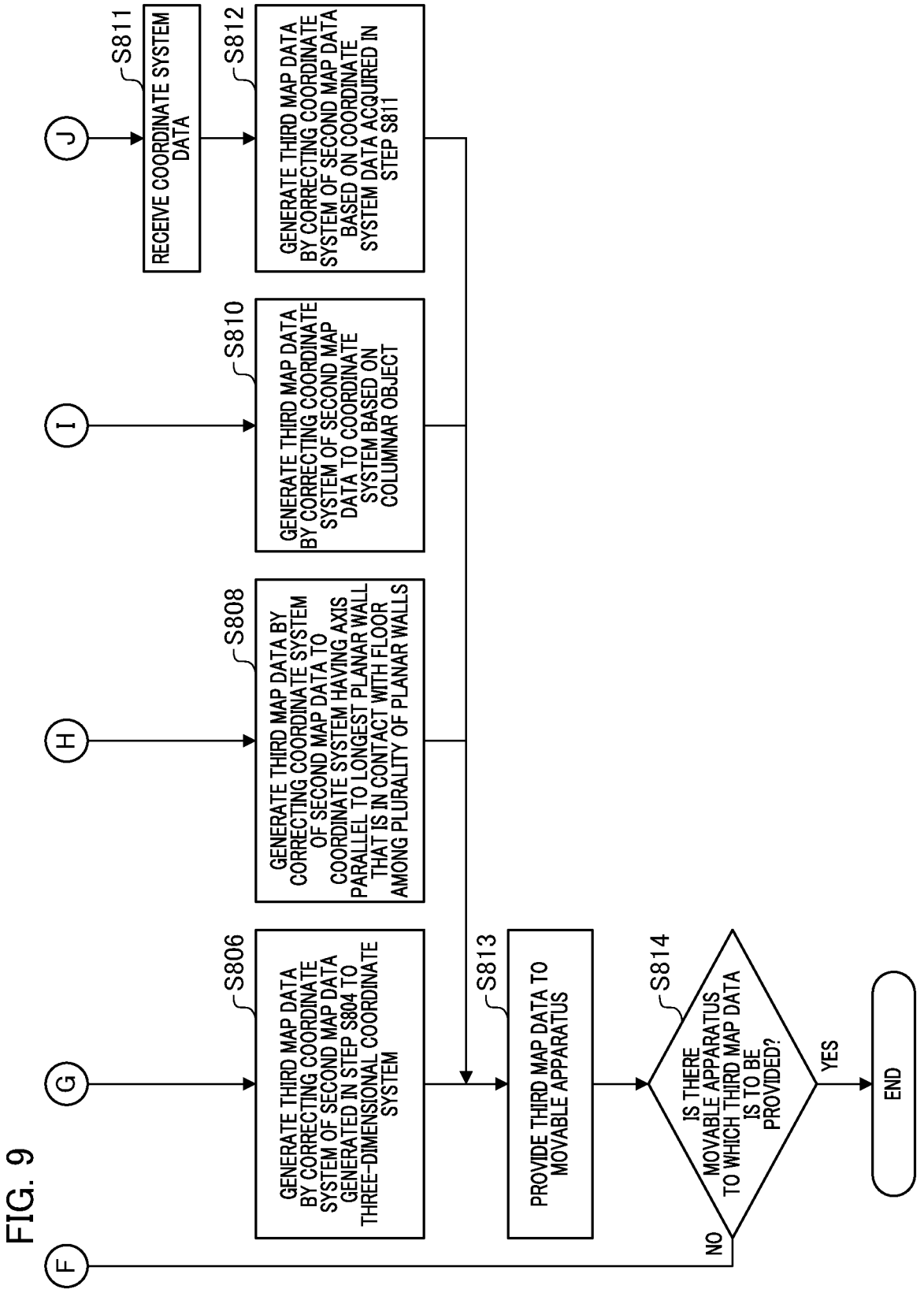

S811

RECEIVE COORDINATE SYSTEM DATA

S812

GENERATE THIRD MAP DATA BY CORRECTING COORDINATE SYSTEM OF SECOND MAP DATA BASED ON COORDINATE SYSTEM DATA ACQUIRED IN STEP S811

J

S810

GENERATE THIRD MAP DATA BY CORRECTING COORDINATE SYSTEM OF SECOND MAP DATA TO COORDINATE SYSTEM BASED ON COLUMNAR OBJECT

I

S808

GENERATE THIRD MAP DATA BY CORRECTING COORDINATE SYSTEM OF SECOND MAP DATA TO COORDINATE SYSTEM HAVING AXIS PARALLEL TO LONGEST PLANAR WALL THAT IS IN CONTACT WITH FLOOR AMONG PLURALITY OF PLANAR WALLS

H

S806

GENERATE THIRD MAP DATA BY CORRECTING COORDINATE SYSTEM OF SECOND MAP DATA GENERATED IN STEP S804 TO THREE-DIMENSIONAL COORDINATE SYSTEM

G

S813

PROVIDE THIRD MAP DATA TO MOVABLE APPARATUS

S814

IS THERE MOVABLE APPARATUS TO WHICH THIRD MAP DATA IS TO BE PROVIDED?

YES

NO

F

END

MAP DATA PROVIDING DEVICE, STORAGE MEDIUM, AND MAP DATA PROVIDING METHOD

BACKGROUND OF THE INVENTION

Field of the Invention

The present invention relates to a map data providing device, a storage medium, and a map data providing method.

Description of the Related Art

Currently, autonomous mobile robots that can autonomously move around various locations such as office buildings, residences, and distribution centers, and perform predetermined actions such as work, are being developed. Such movable apparatuses require a map of a space when autonomously moving in the space and performing predetermined actions. As a technique for providing such a map to a movable apparatus that moves autonomously, for example, a map information providing system disclosed in Japanese Patent Application Laid-Open No. 2021-77053 can be cited.

The map information providing system includes a database, image data generation means, and data transmission and reception means. The database stores three-dimensional point group data regarding an area in which an autonomous mobile device travels.

The image data generation means generates two-dimensional planar image data by cutting out two-dimensional point group data at a height designated by the autonomous mobile device from the three-dimensional point group data read from the database. The data transmission and reception means can transmit the two-dimensional planar image data or point group data generated by the image data generation means to the autonomous mobile device.

However, for the above-mentioned movable apparatus, a range in which the movable apparatus moves and performs a predetermined action is individually set, and the range may be changed depending on a situation. For example, even when a movable apparatus has map data showing a map for a specific floor of an office building, the movable apparatus may operate only in a certain section away from the origin of the map.

When the movable apparatus estimates its own position, the accuracy of a result obtained by estimating a position based on its own rotation is lower than a result obtained by estimating a position based on its own translation, and the movable apparatus may continue to operate with an accuracy lower than the accuracy desired by a user.

When the movable apparatus has map data including a range other than a section in which it actually operates, the movable apparatus uses a memory capacity more than necessary. Thus, the map information providing system disclosed in Japanese Patent Application Laid-open No. 2021-77053 may not be able to provide a suitable map for individual movable apparatuses to operate autonomously.

SUMMARY OF THE INVENTION

In order to solve the above-described problems, a map data providing device according to one aspect of the present invention includes at least one processor or circuit configured to function as an activity range data acquisition unit configured to acquire activity range data indicating an activity range in which a movable apparatus operates autonomously, a determination unit configured to determine a coordinate system and origin of map data to be provided to the movable apparatus based on the activity range data, and a map data providing unit configured to provide the map data based on the coordinate system and origin determined by the determination unit to the movable apparatus.

Further features of the present invention will become apparent from the following description of embodiments with reference to the attached drawings.

BRIEF DESCRIPTION OF THE DRAWINGS

FIG. 1 is a diagram illustrating examples of a movable apparatus, a map data providing device, and a user terminal according to an embodiment.

FIG. 9 is a flowchart showing an example of processing performed by the map data providing device according to the embodiment.

DESCRIPTION OF THE EMBODIMENTS

Figure 2:
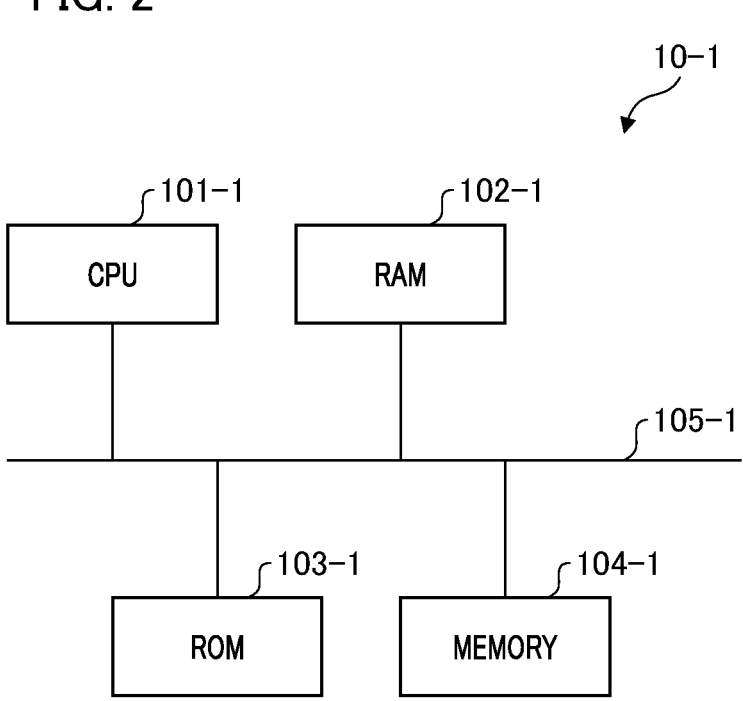
FIG. 2 is a diagram illustrating an example of a hardware configuration of a movable apparatus management device according to the embodiment.

Hereinafter, with reference to the accompanying drawings, favorable modes of the present invention will be described using an embodiment. In each diagram, the same reference signs are applied to the same members or elements, and duplicate description will be omitted or simplified.

Embodiment

Figure 1:
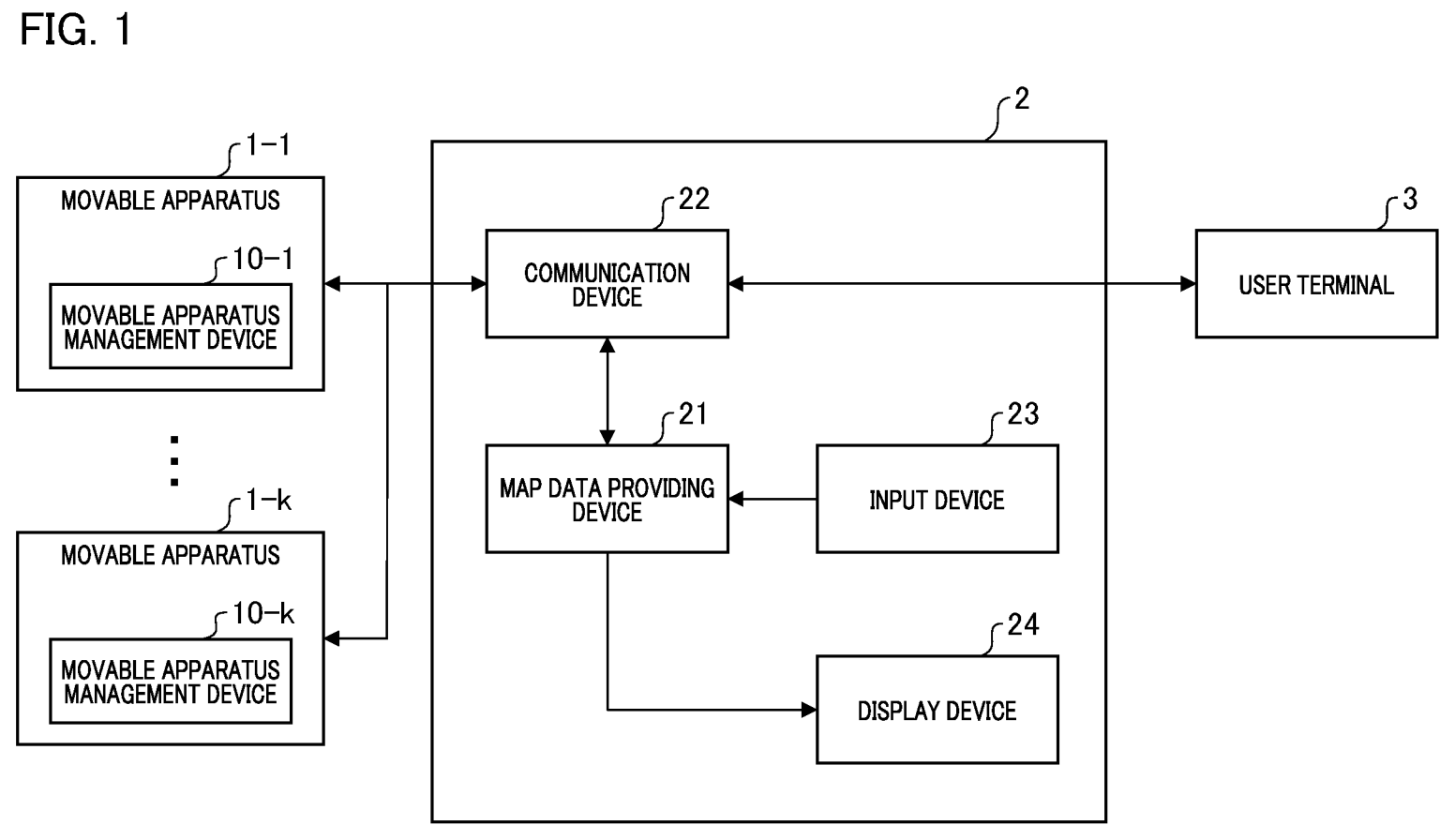

FIG. 1 is a diagram illustrating examples of a movable apparatus, a map data providing device, and a user terminal according to an embodiment. FIG. 1 includes a movable apparatus 1-1 to a movable apparatus 1-$k$ (k: an integer of 1 or more), an information processing device 2, and a user terminal 3.

The movable apparatus 1-1, . . . , and the movable apparatus 1-$k$ are, for example, autonomous mobile robots that perform predetermined actions such as cleaning or transporting a load in a space inside a building such as an office building, automated guided vehicles (AGVs), or the like.

Each of the movable apparatus 1-1, . . . , and the movable apparatus 1-$k$ is equipped with a sensor, and measures its own position and orientation by simultaneous localization and mapping (SLAM) or the like using the sensor to understand its surrounding space and operates autonomously in the space. The operation as mentioned here means moving in the space and performing a predetermined action.

The above-mentioned sensor is, for example, a two-dimensional or three-dimensional light detection and ranging (LIDAR) or a stereo camera. The LIDAR measures a distance to each point on each object in a space using light and generates point group data, thereby ascertaining the position, dimensions, shape, and the like of each object in the space.

The stereo camera measures a distance to each point on each object in a space based on triangulation and generates a set of feature points, thereby ascertaining the position, dimensions, shape, and the like of each object in the space.

When the movable apparatus 1-1, . . . , and the movable apparatus 1-$k$ autonomously move in a space, they require a map of the space. This map is, for example, data in which the inside of the space is expressed as two-dimensional or three-dimensional point group data using a LIDAR or data in which the inside of the space is expressed as a set of feature points of objects recognized using a stereo camera. In the following description, data indicating a map used by the movable apparatus 1-1, . . . , or the movable apparatus 1-$k$ will be referred to as map data.

The movable apparatus 1-1, . . . , and the movable apparatus 1-$k$ measure their own positions and orientations that are separated into translational components related to their own translation and rotational components related to their own rotation. Then, when the movable apparatus 1-1, . . . , and the movable apparatus 1-$k$ measure the rotational components of their own positions and orientations, they approximate that a portion of a trigonometric function, which is a type of nonlinear function, is linear, and repeatedly perform an arithmetic operation.

For this reason, as the positions of the movable apparatus 1-1, . . . , and the movable apparatus 1-$k$ become farther from the origin of the coordinate system of the map data, the contribution of the amount of change in a translational component and the contribution of noise become larger than the amount of change in a rotational component and the contribution of noise with respect to changes in parameters related to their own positions and orientations.

Thus, regarding the movable apparatus 1-1, . . . , and the movable apparatus 1-$k$, the parameters converge before the rotational components of the parameters are optimized, and the movable apparatus 1-1, . . . , and the movable apparatus 1-$k$ may not be able to measure their own positions and orientations with sufficient accuracy when they operate autonomously in the space.

The movable apparatus 1-1 includes a movable apparatus management device 10-1 illustrated in FIG. 1. The movable apparatus management device 10-1 transmits attribute data and activity range data, which will be described later, to a map data providing device 21, and receives third map data, which will be described later, from the map data providing device 21.

Similarly, the movable apparatus 1-$k$ includes a movable apparatus management device 10-$k$ illustrated in FIG. 1. The movable apparatus management device 10-$k$ transmits attribute data and activity range data, which will be described later, to the map data providing device 21, and receives third map data, which will be described later, from the map data providing device 21. Details of the movable apparatus management devices 10-1, . . . , and the movable apparatus management device 10-$k$ will be described later.

The movable apparatus management device 10-1 may not be mounted on the movable apparatus 1-1. For example, the movable apparatus management device 10-1 may be mounted on a device other than the movable apparatus 1-1, or may be one independent device.

Similarly, the movable apparatus management device 10-$k$ may not be mounted on the movable apparatus 1-$k$. For example, the movable apparatus management device 10-$k$ may be mounted on a device other than the movable apparatus 1-$k$, or may be one independent device. In the following description, when the movable apparatus 1-1, . . . , and the movable apparatus 1-$k$ are described, the movable apparatus 1-1 will be used as an example.

The information processing device 2 is installed, for example, in a data center. As illustrated in FIG. 1, the information processing device 2 includes the map data providing device 21, a communication device 22, an input device 23, and a display device 24.

The map data providing device 21 generates third map data, which will be described later, based on attribute data and activity range data, which will be described later, and provides the third map data to the movable apparatus 1-1, . . . , or the movable apparatus 1-$k$. Details of the map data providing device 21 will be described later.

The communication device 22 realizes communication between the information processing device 2 and the movable apparatus 1-1, . . . , the movable apparatus 1-$k$, or the user terminal 3. The input device 23 is, for example, a mouse or a keyboard, and is used to input data, instructions, and the like to the information processing device 2. The display device 24 is, for example, a display, and displays information presented to a user of the information processing device 2, or the like.

The user terminal 3 is, for example, a computer installed at a management base located at a location different from the data center. The user terminal 3 is used to operate the information processing device 2 from the management base which is different from the data center.

The management base can be installed at any location, and may be installed at the same location as the data center, for example.

Next, a hardware configuration of the movable apparatus management device according to the embodiment will be described with reference to FIG. 2. FIG. 2 is a diagram illustrating an example of a hardware configuration of the movable apparatus management device according to the embodiment.

As illustrated in FIG. 2, the mobile management device 10-1 includes a central processing unit (CPU) 101-1, a random access memory (RAM) 102-1, a read only memory (ROM) 103-1, a memory 104-1, and a bus 105-1.

The CPU 101-1 realizes each function of the movable apparatus management device 10-1 by reading and executing programs. The RAM 102-1 is a recording medium in which a program read and executed by the CPU 101-1 is temporarily expanded.

The ROM 103-1 is a recording medium that stores a program that is read and executed by the CPU 101-1. The memory 104-1 is a recording medium that stores driving data and the like. The bus 105-1 connects the CPU 101-1, the RAM 102-1, the ROM 103-1, and the memory 104-1 in a manner that allows them to communicate with each other.

Figure 3:
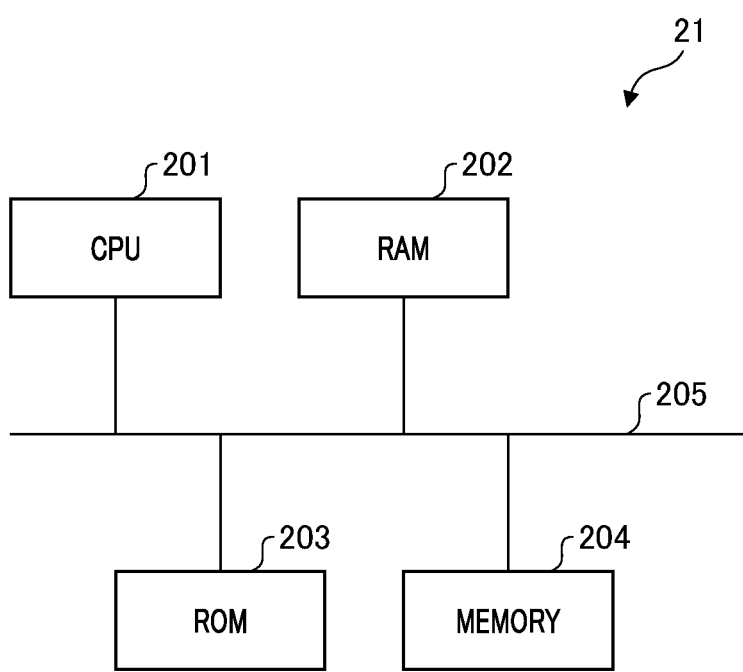
FIG. 3 is a diagram illustrating an example of a hardware configuration of the map data providing device according to the embodiment.

Next, a hardware configuration of the map data providing device 21 according to the embodiment will be described with reference to FIG. 3. FIG. 3 is a diagram illustrating an example of a hardware configuration of the map data providing device according to the embodiment. The map data providing device 21 includes a CPU 201, a RAM 202, an ROM 203, a memory 204, and a bus 205, as illustrated in FIG. 3.

The CPU 201 realizes each function of the map data providing device 21 by reading and executing programs. The RAM 202 is a recording medium in which a program read and executed by the CPU 201 is temporarily expanded.

The ROM 203 is a recording medium that stores a program that is read and executed by the CPU 201. The memory 204 is a recording medium that stores map data and the like. The bus 205 connects the CPU 201, the RAM 202, the ROM 203, and the memory 204 in a manner that allows them to communicate with each other.

Figure 4:
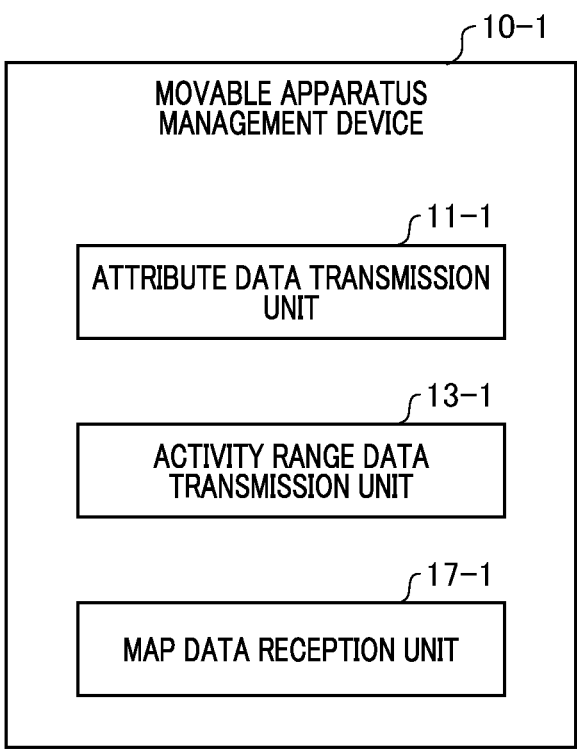
FIG. 4 is a diagram illustrating an example of a software configuration of the movable apparatus management device according to the embodiment.
Figure 5:
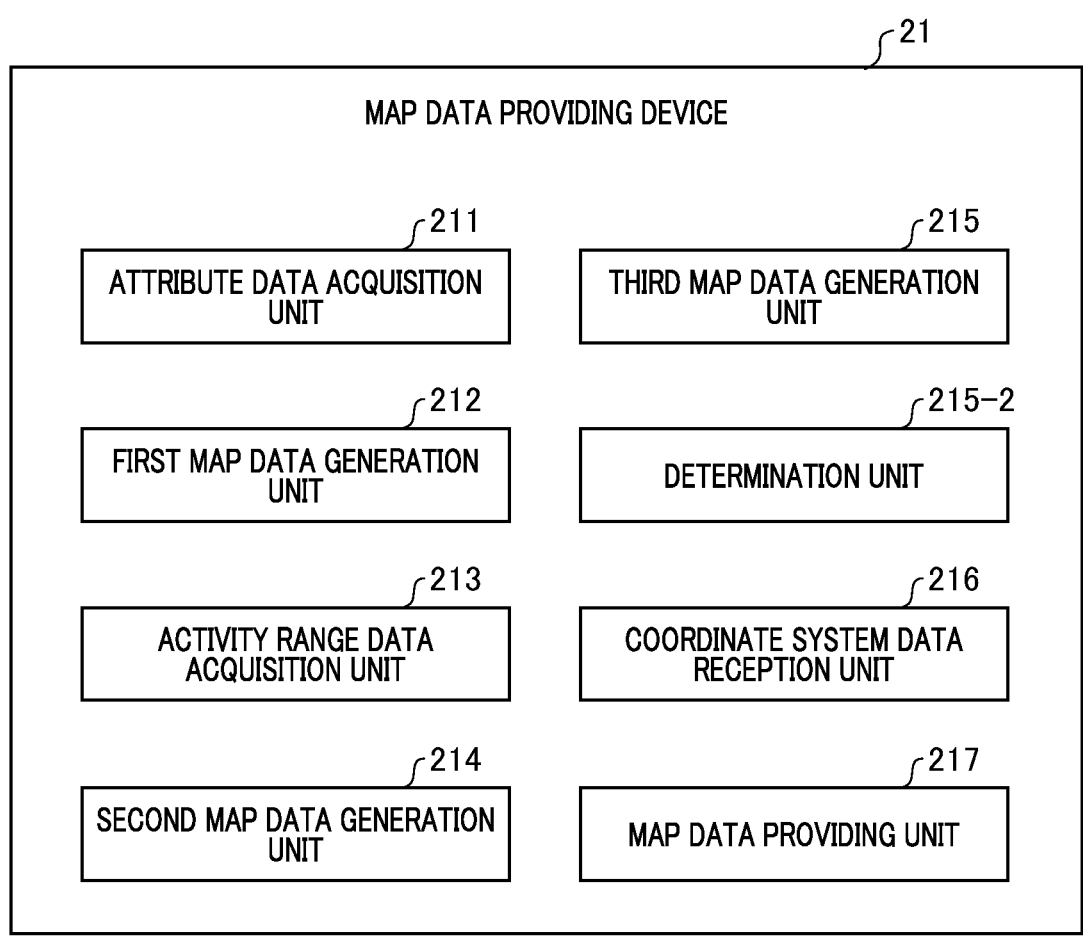
FIG. 5 is a diagram illustrating an example of a software configuration of the map data providing device according to the embodiment.

Next, a software configuration of the movable apparatus management device and a software configuration of the map data providing device according to the embodiment will be described with reference to FIGS. 4 to 7. FIG. 4 is a diagram illustrating an example of a software configuration of the movable apparatus management device according to the embodiment. FIG. 5 is a diagram illustrating an example of a software configuration of the map data providing device according to the embodiment.

As illustrated in FIG. 4, the movable apparatus management device 10-1 includes an attribute data transmission unit 11-1, an activity range data transmission unit 13-1, and a map data reception unit 17-1.

As illustrated in FIG. 5, the map data providing device 21 includes an attribute data acquisition unit 211, a first map data generation unit 212, an activity range data acquisition unit 213, a second map data generation unit 214, a third map data generation unit 215, a determination unit 215-2, a coordinate system data reception unit 216, and a map data providing unit 217.

The map data providing device 21 does not necessarily need to provide map data after going through procedures of acquiring attribute data and generating first map data and second map data. For this reason, the attribute data acquisition unit 211, the first map data generation unit 212, the second map data generation unit 214, and the coordinate system data reception unit 216 are not essential.

The map data providing device 21 determines the coordinate system and origin of map data to be provided to the movable apparatus 1-1, . . . , or the movable apparatus 1-$k$ based on activity range data, and provides the map data based on the determined coordinate system and origin to the movable apparatus 1-1, . . . , or the movable apparatus 1-$k$.

Figure 6:
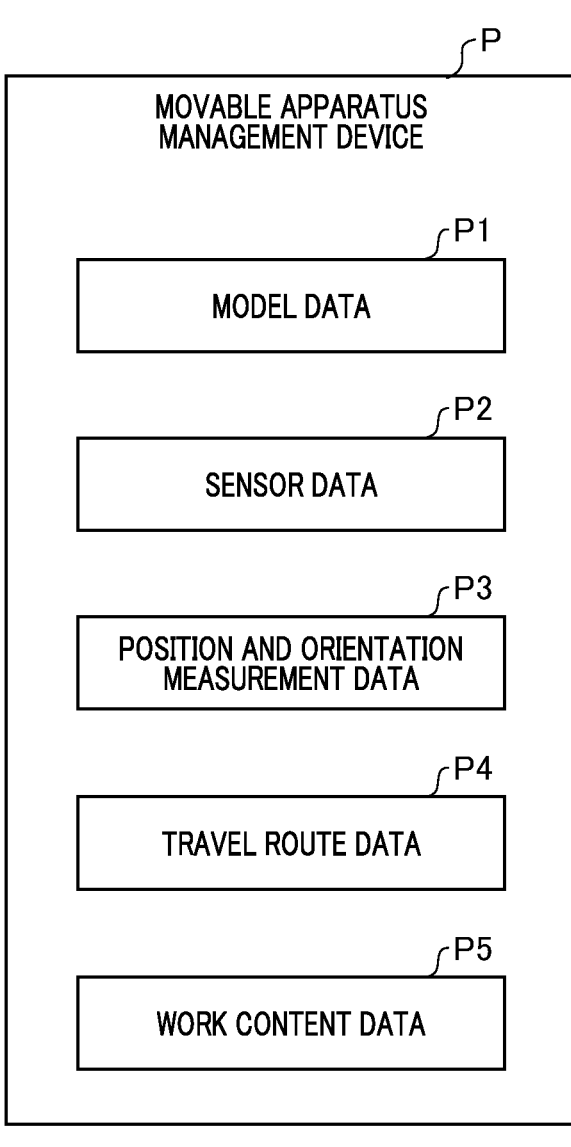
FIG. 6 is a diagram illustrating an example of attribute data according to the embodiment.

FIG. 6 is a diagram illustrating an example of attribute data according to the embodiment. The attribute data transmission unit 11-1 transmits attribute data P illustrated in FIG. 6 to the map data providing device 21. The attribute data acquisition unit 211 acquires the attribute data P illustrated in FIG. 6 from the attribute data transmission unit 11-1.

The attribute data P indicates the attributes of the movable apparatus 1-1 that acts autonomously in the space. For example, as illustrated in FIG. 6, the attribute data P includes model data P1, sensor data P2, position and orientation measurement data P3, travel route data P4, and work content data P5.

The model data P1 indicates information regarding at least one of the model, use, function, and the like of the movable apparatus 1-1. The model data P1 can also be used for managing the movable apparatus 1-1. The information regarding the model is, for example, information for uniquely identifying the name, model name, type name, product name, model, type, and the like of the movable apparatus 1-1.

Examples of the information regarding the use include the overall length, width, and height dimensions of the movable apparatus 1-1, the weight of the movable apparatus 1-1, the dimensions of loads that can be loaded on the movable apparatus 1-1, a method of transporting loads by the movable apparatus 1-1, performance related to the movement of the movable apparatus 1-1, and parts operating within the movable apparatus 1-1.

Examples of the method of transporting loads by the movable apparatus 1-1 include stacking, lifting, and towing. Examples of the performance related to the movement of the movable apparatus 1-1 include the speed of the movable apparatus 1-1, a range in which the movable apparatus 1-1 can change a direction, and the radius of rotation of the movable apparatus 1-1.

Examples of the information regarding functions include information regarding functions related to the type of movable apparatus 1-1 and information regarding functions that are not related to the type of movable apparatus 1-1. Examples of the functions related to the type of movable apparatus 1-1 include transporting loads, cleaning buildings, and guarding buildings.

Examples of the functions that are not related to the type of movable apparatus 1-1 include a function of giving a notice or presenting information to the user of the movable apparatus 1-1, and a function of receiving information from the user of the movable apparatus 1-1, or the like be.

The sensor data P2 indicates information regarding at least one of the type of sensor, the accuracy with which the sensor measures an object existing in the space, a range in which the sensor can measure the object existing in the space, and the position, orientation, and the like of the sensor attached to the movable apparatus 1-1.

The information regarding the type of sensor indicates, for example, the type and method of a sensor such as a two-dimensional or three-dimensional LIDAR, a stereo camera, or the like. The information regarding the accuracy of the sensor indicates, for example, a resolution of a distance that can be measured by the sensor, a resolution of an angle that can be measured by the sensor, and the number of times that the space is scanned by the sensor.

The information regarding the range that can be measured by the sensor indicates, for example, the range of a distance that can be measured by the sensor and the range of an angle that can be measured by the sensor. The information regarding the position, orientation, and the like of the sensor attached to the movable apparatus 1-1 indicates, for example, at least one of the position and direction of the sensor attached to the exterior of the movable apparatus 1-1.

The position and orientation measurement data P3 indicates information regarding a method of processing for measuring at least one of the position and orientation of the movable apparatus 1-1 using a sensor. The traveling route data P4 indicates a position through which the movable apparatus 1-1 moves in the space, a speed at which the movable apparatus 1-1 moves in the space, and the like. The work content data P5 indicates the content of work performed in the space by the movable apparatus 1-1.

Figure 7:
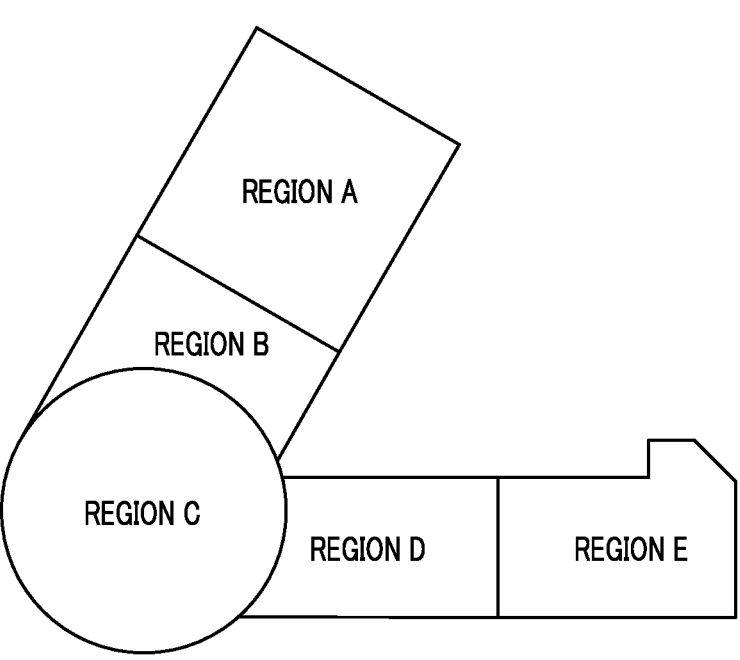
FIG. 7 is a diagram illustrating an example of a range in which the movable apparatus according to the embodiment can operate.

FIG. 7 is a diagram illustrating an example of a range in which the movable apparatus according to the embodiment can operate. FIG. 7 illustrates a region A, a region B, a region C, a region D, and a region E included in a floor of a building. The region A is a region surrounded by four planar walls.

The region B is a region surrounded by three planar walls and one cylindrical surface. The region C is a region surrounded by one cylindrical wall. The region D is a region surrounded by three planar walls and one cylindrical surface. The region E is a region surrounded by seven planar walls.

The first map data generation unit 212 generates first map data based on the attribute data P, the first map data indicating a map used when the movable apparatus 1-1 autonomously operates in the space. The first map data shows, for example, maps of the region A, the region B, the region C, the region D, and the region E illustrated in FIG. 7.

In other words, the first map data is data indicating a map of the entire range in which the movable apparatus 1-1 can move. As described above, this first map data does not necessarily need to be generated by the map data providing device, but first map data generated by another device, for example, another movable apparatus or a device that manages a building in which the movable apparatus moves can be acquired and used.

The first map data generation unit 212 generates first map data using results obtained by measuring the space using at least one of a movable apparatus and a sensor that match the contents indicated by the attribute data P within a certain range.

The movable apparatus as mentioned herein is, for example, a movable apparatus that matches at least one of the contents indicated by the model data P1, position and orientation measurement data P3, traveling route data P4, or work content data P5 illustrated in FIG. 6 within a certain range. The sensor as mentioned herein is, for example, a sensor that matches at least one of the contents indicated by the sensor data P2 illustrated in FIG. 6 within a certain range.

The activity range data transmission unit 13-1 transmits activity range data to the activity range data acquisition unit 213. The activity range data acquisition unit 213 acquires the activity range data from the activity range data transmission unit 13-1. The activity range data indicates a range in which the movable apparatus 1-1 operates. For example, the activity range data indicates the map of one of the region A, the region B, the region C, the region D, and the region E illustrated in FIG. 7.

The second map data generation unit 214 generates second map data by deleting portions of the first map data which are unnecessary for the movable apparatus based on the activity range data. Even when the deletion processing is not performed, it is possible to obtain second map data of an appropriate range, for example, by extracting data of a region that corresponds to the activity range.

The second map data shows a map of a range in which the movable apparatus 1-1 actually operates, rather than the entire range in which the movable apparatus 1-1 can move.

For example, the second map data generation unit 214 generates second map data by deleting the maps of four regions other than one region in which the movable apparatus 1-1 actually operates, among the regions A, B, C, D, and E indicated by the first map data. Furthermore, it is possible to obtain second map data of an appropriate range by extracting the region of the activity range without going through the deletion processing.

The determination unit 215-2 determines the coordinate system and origin of map data to be provided to the movable apparatus based on the activity range data. The third map data generation unit 215 generates third map data, for example, by correcting the coordinate system of the second map data based on the activity range data, in accordance with an instruction received from the determination unit 215-2.

Hereinafter, a procedure of correcting the coordinate system of second map data to generate third map data will be described, but third map data can be provided without going through a step of correcting the coordinate system of second map data as long as a coordinate system appropriate for a movable apparatus of which the activity range is determined can be determined.

Specifically, when a planar wall exists in a region indicated by the second map data, the third map data generation unit 215 generates the third map data by correcting the coordinate system of the second map data to a coordinate system having an axis parallel to the planar wall.

When there are a plurality of planar walls in a region indicated by the second map data, the third map data generation unit 215 may generate the third map data by correcting the coordinate system of the second map data to a coordinate system having an axis parallel to the longest planar wall that is in contact with the floor.

For example, when the region indicated by the second map data is the region A, the region B, the region D, or the region E illustrated in FIG. 7, the third map data generation unit 215 performs one of the two processes.

When a step of correcting the coordinate system of the second map data is not performed, and, for example, when the activity range of the movable apparatus is the region A, a coordinate system having an axis parallel to a boundary line (wall) is determined to be the coordinate system of the third map data with a point at which a boundary between region A and the region B and a boundary between region A and a region other than the regions illustrated in FIG. 7 intersect each other as the origin.

Alternatively, when a columnar object exists in the region indicated by the second map data, the third map data generation unit 215 generates third map data by correcting the coordinate system of the second map data to a coordinate system based on the columnar object. The columnar object is, for example, a pillar of a building, and is an object that is installed in a building and has a length of a certain length or more in the vertical direction.

For example, in such a case, the third map data generation unit 215 generates third map data by correcting the coordinate system of the second map data to a three-dimensional coordinate system having at least one of an axis along the longitudinal direction of the columnar object and an axis perpendicular to the axis.

For example, in such a case, the third map data generation unit 215 generates third map data by correcting the coordinate system of the second map data to a coordinate system having an origin included on the surface of the columnar object or inside the columnar object.

For example, when a plurality of columnar objects exist in the region indicated by the second map data, the third map data generation unit 215 generates third map data by correcting the coordinate system of the second map data to a coordinate system having an axis along the alignment of the plurality of columnar objects.

The coordinate system data reception unit 216 receives coordinate system data for designating the coordinate system of the third map data. For example, the coordinate system data is input to the map data providing device 21 using the input device 23 illustrated in FIG. 1.

When the coordinate system data is received by the coordinate system data reception unit 216, the third map data generation unit 215 may generate third map data by correcting the coordinate system of the second map data based on the coordinate system data.

Figure 8:
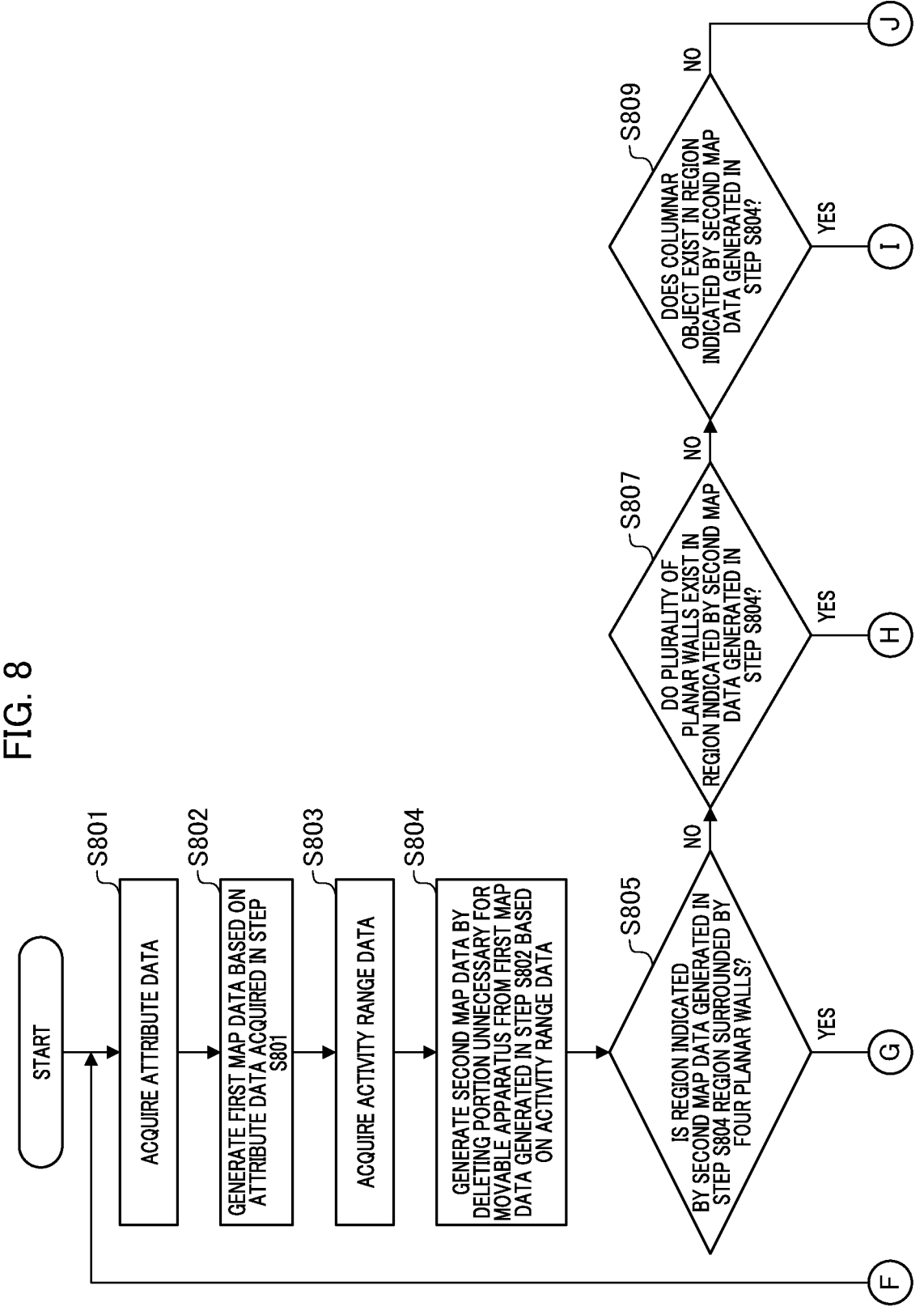
FIG. 8 is a flowchart showing an example of processing performed by the map data providing device according to the embodiment.

Next, processing performed by the map data providing device 21 according to the embodiment will be described with reference to FIGS. 8 and 9. FIGS. 8 and 9 are flowcharts illustrating an example of processing performed by the map data providing device according to the embodiment.

The flowchart illustrated in FIG. 8 and the flowchart illustrated in FIG. 9 are connected by a connector F, a connector G, a connector H, a connector I, and a connector J. The map data providing device 21 does not necessarily need to provide map data after going through steps of acquiring attribute data and generating first map data and second map data.

For this reason, at least one of step S801, step S802, step S804, step S806, step S808, and step S810 may be omitted or may be replaced with another processing.

In step S801, the attribute data acquisition unit 211 acquires attribute data. In step S802, the first map data generation unit 212 generates first map data based on the attribute data acquired in step S801.

In step S803, the activity range data acquisition unit 213 acquires activity range data. In step S804, the second map data generation unit 214 generates second map data by deleting a portion unnecessary for the movable apparatus from the first map data generated in step S802 based on the activity range data.

The second map data generation unit 214 can also generate second map data by extracting a necessary portion. In step S805, the third map data generation unit 215 determines whether the region indicated by the second map data generated in step S804 is a region surrounded by four planar walls.

When the third map data generation unit 215 determines that the region indicated by the second map data generated in step S804 is a region surrounded by four planar walls (step S805: YES), the processing proceeds to step S806.

On the other hand, when the third map data generation unit 215 determines that the region indicated by the second map data generated in step S804 is not a region surrounded by four planar walls (step S805: NO), the processing proceeds to step S807.

In step S806, the third map data generation unit 215 generates third map data by correcting the coordinate system of the second map data generated in step S804 to a three-dimensional coordinate system.

This three-dimensional coordinate system is a coordinate system that has two axes parallel to walls of two planes that are in contact with each other, and one axis parallel to an intersection line between the walls of the two planes. The third map data generation unit 215 can also obtain third map data by determining the coordinate system of the third map data using information on the activity range of the movable apparatus which is obtained in step S805 instead of correcting the coordinate system of the second map data.

Third map data may be generated within the map data providing device 21 or may be generated by another device based on the determined coordinate system. These contents are the same for step S808, step S810, and step S812.

In step S807, the third map data generation unit 215 determines whether a plurality of planar walls exist in the region indicated by the second map data generated in step S804.

When the third map data generation unit 215 determines that a plurality of planar walls exist in the region indicated by the second map data generated in step S804 (step S807: YES), the third map data generation unit 215 causes the processing to proceed to step S808.

On the other hand, when the third map data generation unit 215 determines that a plurality of planar walls do not exist in the region indicated by the second map data generated in step S804 (step S807: NO), the third map data generation unit 215 causes the processing to proceed to step S809.

In step S808, the third map data generation unit 215 generates third map data by correcting the coordinate system of the second map data to a coordinate system having an axis parallel to the longest planar wall that is in contact with the floor with a longest length among the plurality of planar walls.

In step S809, the third map data generation unit 215 determines whether a columnar object exists in the region indicated by the second map data generated in step S804. When the third map data generation unit 215 determines that a columnar object exists in the region indicated by the second map data generated in step S804 (step S809: YES), the third map data generation unit 215 causes the processing to proceed to step S810.

On the other hand, when the third map data generation unit 215 determines that there is no columnar object in the region indicated by the second map data generated in step S804 (step S809: NO), the third map data generation unit 215 causes the processing to proceed to step S811.

In step S810, the third map data generation unit 215 generates third map data by correcting the coordinate system of the second map data to a coordinate system based on the columnar object.

In step S811, the coordinate system data acquisition unit 215 receives coordinate system data. When the coordinate system cannot be determined from the shape of the region of the activity range of the movable apparatus, the coordinate system is received from the outside of the device.

In the flowchart of FIG. 8, step S811 is performed when the determination results in step S805, step S807, and step S809 are NO. However, the coordinate system data may be received in step S811 without going through steps S805, S807, and S809, and the determination processing in steps S805, S807, and S809 may not be performed.

In step S812, the third map data generation unit 215 generates third map data by correcting the coordinate system of the second map data based on the coordinate system data acquired in step S811.

In step S813, the map data providing unit 217 provides the third map data to the movable apparatus. The third map data is generated in step S806, step S808, step S810, or step S812.

In step S814, the map data providing device 21 determines whether there is a movable apparatus to which the third map data is to be provided.

The map data providing device 21 according to the embodiment has been described above. The map data providing device 21 provides third map data indicating a map of a range in which the movable apparatus 1-1 actually operates instead of providing first map data that includes a map of a range in which the movable apparatus 1-1 does not actually operate.

For this reason, the map data providing device 21 provides map data with a small amount of data to the movable apparatus 1-1, and can prevent the capacity of the memory mounted on the movable apparatus 1-1 from being occupied more than necessary.

For this reason, the map data providing device 21 can converge parameters related to its own position and orientation while bringing rotational components of the parameters closer to optimal values. Thus, the map data providing device 21 can measure its own position and orientation with sufficient accuracy when it operates autonomously in a space.

The map data providing device 21 provides third map data to the movable apparatus 1-1 instead of providing second map data having a coordinate system that does not match the shape of the range in which the movable apparatus 1-1 actually operates, the third map data having a coordinate system that matches the shape of the range in which the movable apparatus 1-1 actually operates.

For this reason, the map data providing device 21 can reduce the number of parameters that need to be used when measuring its own position and orientation, and can reduce a load of processing for measuring its own position and orientation.

In the above-described embodiment, a case where a sensor is mounted on the movable apparatus 1-1 and the like has been described as an example, but the present invention is not limited thereto. The sensor is a movable apparatus different from the movable apparatus 1-1, . . . , and the movable apparatus 1-*k*, and may be mounted on a movable apparatus that has already been introduced into the space.

The sensor may be a sensor that is used by a worker who measures objects existing in the space instead of being mounted on the movable apparatus 1-1, . . . , the movable apparatus 1-*k*, and the movable apparatus that has already been introduced into the space.

In the above-described embodiment, a case where attribute data and activity range data are separated has been described as an example, but the present invention is not limited thereto. For example, the activity range data may be included in the attribute data.

In the above-described embodiment, a case where the attribute data acquisition unit 211 acquires the attribute data of the movable apparatus 1-1 from the movable apparatus 1-1 has been described as an example, but the present invention is not limited thereto. For example, the attribute data acquisition unit 211 may acquire the attribute data of the movable apparatus 1-1 from a device other than the movable apparatus 1-1.

Alternatively, the attribute data acquisition unit 211 may acquire attribute data that is input by a user who manages the movable apparatus 1-1. Alternatively, the attribute data acquisition unit 211 may acquire attribute data by reading a code affixed to the surface of a building or the movable apparatus 1-1.

This code is, for example, a two-dimensional code. These contents are the same for the movable apparatus 1-2, . . . , and the movable apparatus 1-*k*.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the map data providing device through a network or various storage media. Then, a computer (or a CPU, an MPU, or the like) of the map data providing device may be configured to read and execute the program. In such a case, the program and the storage medium storing the program configure the present invention.

Further, the present invention includes, for example, those realized using at least one processor or circuit configured to function of the embodiments explained above. Note that distributed processing may be performed using a plurality of processors.

This application claims the benefit of Japanese Patent Application No. 2023-002067, filed on Jan. 11, 2023, which is hereby incorporated by reference herein in its entirety.

What is claimed is:

1. A map data providing device comprising at least one processor or circuit configured to function as:
   an attribute data acquisition unit configured to acquire attribute data of a movable apparatus;
   a first map data generation unit configured to generate first map data based on the attribute data, the first map data being used when the movable apparatus autonomously operates;
   an activity range data acquisition unit configured to acquire activity range data indicating an activity range in which the movable apparatus operates autonomously;
   a second map data generation unit configured to generate second map data by deleting portions of the first map data which are unnecessary for the movable apparatus to operate autonomously based on the activity range;
   a determination unit configured to determine a coordinate system and origin of map data to be provided to the movable apparatus based on the activity range data;
   a third map data generation unit configured to generate third map data by correcting a coordinate system of the second map data based on the determined coordinate system and the origin of the map data; and
   a map data providing unit configured to provide the third map data to the movable apparatus.

2. The map data providing device according to claim 1, wherein, when a planar wall exists in the activity range, the determination unit determines the coordinate system of the map data to be a coordinate system having an axis parallel to the planar wall.

3. The map data providing device according to claim 2, wherein, when a plurality of the planar walls exists in the activity range, the determination unit determines the coordinate system of the map data to be a coordinate system having an axis parallel to a longest planar wall that is in contact with a floor with a longest length among the plurality of planar walls.

4. The map data providing device according to claim 1, wherein, when a columnar object exists in the activity range, the determination unit determines the coordinate system of the map data to be a coordinate system based on the columnar object.

5. The map data providing device according to claim 4, wherein, when a plurality of the columnar objects exists in the activity range, the determination unit determines the coordinate system of the map data to be a coordinate system having an axis along an alignment of the plurality of columnar objects.

6. The map data providing device according to claim 1, wherein the at least one processor or circuit configured to further function as, a coordinate system data reception unit configured to receive coordinate system data for designating the coordinate system of the map data,
   wherein the determination unit determines the coordinate system of the map data based on the coordinate system data.

7. A non-transitory computer-readable storage medium configured to store a computer program comprising instructions for executing following processes:
   acquiring attribute data of a movable apparatus;
   generating first map data based on the attribute data, the first map data being used when the movable apparatus autonomously operates;

acquiring activity range data indicating an activity range in which the movable apparatus operates autonomously;

generating second map data by deleting portions of the first map data which are unnecessary for the movable apparatus to operate autonomously based on the activity range;

determining a coordinate system and origin of map data to be provided to the movable apparatus based on the activity range data;

generating third map data by correcting a coordinate system of the second map data based on the determined coordinate system and the origin of the map data; and providing the third map data to the movable apparatus.

8. A map data providing method comprising:

acquiring attribute data of a movable apparatus;

generating first map data based on the attribute data, the first map data being used when the movable apparatus autonomously operates;

acquiring activity range data indicating an activity range in which a movable apparatus operates autonomously;

generating second map data by deleting portions of the first map data which are unnecessary for the movable apparatus to operate autonomously based on the activity range;

determining a coordinate system and origin of map data to be provided to the movable apparatus based on the activity range data; and generating third map data by correcting a coordinate system of the second map data based on the determined coordinate system and the origin of the map data; and providing the third map data to the movable apparatus.

* * * * *